United States Patent
Bickelman et al.

(10) Patent No.: US 10,380,042 B2
(45) Date of Patent: Aug. 13, 2019

(54) DISPATCH INPUT/OUTPUT TRAFFIC TO CHANNELS WITH MULTIPLE CHANNEL COMMUNICATION ARRAY QUEUES

(71) Applicant: INTERNATIONAL BUSINESS MACHINES CORPORATION, Armonk, NY (US)

(72) Inventors: Craig A. Bickelman, Weatherly, PA (US); Daniel F. Casper, Poughkeepsie, NY (US); Christopher J. Colonna, Ossining, NY (US); John Flanagan, Poughkeepsie, NY (US); Francis Gassert, Monroe, NY (US); Elke G. Nass, Boeblingen (DE); Kenneth J. Oakes, Wappingers Falls, NY (US); Mooheng Zee, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 7 days.

(21) Appl. No.: 15/358,237

(22) Filed: Nov. 22, 2016

(65) Prior Publication Data

US 2018/0143918 A1    May 24, 2018

(51) Int. Cl.
*G06F 13/00* (2006.01)
*G06F 13/16* (2006.01)
*G06F 13/42* (2006.01)

(52) U.S. Cl.
CPC ...... *G06F 13/1642* (2013.01); *G06F 13/4282* (2013.01)

(58) Field of Classification Search
CPC .................. G06F 13/1642; G06F 13/4282
See application file for complete search history.

(56) References Cited

U.S. PATENT DOCUMENTS

| | | | |
|---|---|---|---|
| 6,081,834 A * | 6/2000 | Brandt | H04L 49/90 709/212 |
| 7,028,134 B2 | 4/2006 | Wang et al. | |
| 7,275,084 B2 * | 9/2007 | Paul | G06F 11/2007 709/212 |
| 7,685,335 B2 | 3/2010 | Arndt et al. | |
| 7,774,519 B2 * | 8/2010 | Casper | G06F 13/12 710/2 |
| 8,417,919 B2 | 4/2013 | Allen et al. | |
| 9,372,879 B1 * | 6/2016 | Evenson | G06F 17/30961 |
| 9,715,466 B1 * | 7/2017 | Bickelman | G06F 13/1642 |

(Continued)

OTHER PUBLICATIONS

Khan Zeeshan, "Multi-Threading using NSOperation", Wordpress, Aug. 2014, pp. 1-15.

*Primary Examiner* — Jing-Yih Shyu
(74) *Attorney, Agent, or Firm* — Cantor Colburn LLP; Steven Chiu

(57) ABSTRACT

An example computer-implemented method may include receiving, by a general purpose processor, the I/O operation. The method may further include transmitting, by the general purpose processor, the I/O operation to a system assist processor. The method may further include transmitting, by the system assist processor, the I/O operation to an I/O channel for execution by the I/O channel, wherein transmitting the I/O operation to the I/O channel comprises queuing the I/O operation in the multi-queue. The method may further include executing, by the I/O channel, the I/O operation.

12 Claims, 5 Drawing Sheets

(56) References Cited

U.S. PATENT DOCUMENTS

| | | | |
|---|---|---|---|
| 2006/0209863 A1* | 9/2006 | Arndt | G06F 15/16 370/412 |
| 2009/0037618 A1* | 2/2009 | Casper | G06F 13/12 710/54 |
| 2011/0179416 A1* | 7/2011 | Patale | G06F 9/5011 718/1 |
| 2014/0025859 A1* | 1/2014 | Krause | G06F 13/28 710/308 |
| 2015/0220552 A1* | 8/2015 | Duzly | G06F 3/0688 707/693 |
| 2017/0235584 A1* | 8/2017 | Tchapda | G06F 9/45558 714/57 |
| 2017/0344499 A1* | 11/2017 | Lemay | G06F 13/1642 |
| 2018/0060256 A1* | 3/2018 | Walker | G06F 13/1642 |

* cited by examiner

DISPATCH INPUT/OUTPUT TRAFFIC TO CHANNELS WITH MULTIPLE CHANNEL COMMUNICATION ARRAY QUEUES

BACKGROUND

The present disclosure generally relates to data processing systems and, more particularly, relates to components of a channel subsystem of a data processing system.

A channel subsystem (CSS) directs the flow of information between input/output (I/O) devices and main storage of a data processing system and is mainly comprised of one or more I/O processors (IOPs) and I/O channel paths (channels) with some participation of the central processors (CPs). IOPs are also synonymously referred to as system assist processors (SAPs).

In a simple data processing system, I/O instructions are initiated by a CP that might execute a sequence of instructions that partly use only the resources of the CP and that partly directly control the resources and the operations of the CSS. In some situations, IOPs perform a portion of an I/O operation, and one or more channels handle other parts of the I/O operation. The IOPs determine which channel to select for an I/O operation. The channels handle the actual data transfers into and out of processor memory and execute commands by forming orders that are sent to the I/O device controllers. The IOP also handles general parts of the I/O operation such as communicating with the CPs through interfaces such as control blocks in reserved memory called hardware system area (HSA), scheduling the I/O operations, and reporting status conditions to a CP. A single IOP can handle requests from multiple CPs and report status to different CPs.

SUMMARY

According to examples of the present disclosure, techniques including methods, systems, and/or computer program products for queuing an input/output (I/O) operation in a multi-queue are provided. An example method may include receiving, by a general purpose processor, the I/O operation. The method may further include transmitting, by the general purpose processor, the I/O operation to a system assist processor. The method may further include transmitting, by the system assist processor, the I/O operation to an I/O channel for execution by the I/O channel, wherein transmitting the I/O operation to the I/O channel comprises queuing the I/O operation in the multi-queue. The method may further include executing, by the I/O channel, the I/O operation.

According to examples of the present disclosure, the multi-queue may be a channel communication array multi-queue. The multi-queue may include a plurality of queues dedicated to the I/O channel. The multi-queue may also include an additional queue for queuing serialized operations.

The present techniques provide advantages, such as implementing a number of redundant CCA queues for a performance-critical workload in order to maximize throughput on a channel. By enabling more than one pipe to an I/O channel, concurrent operations by multiple IOPs can be supported simultaneously. In examples, this is work that can be handled in parallel and out-of-order.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Figure 1:
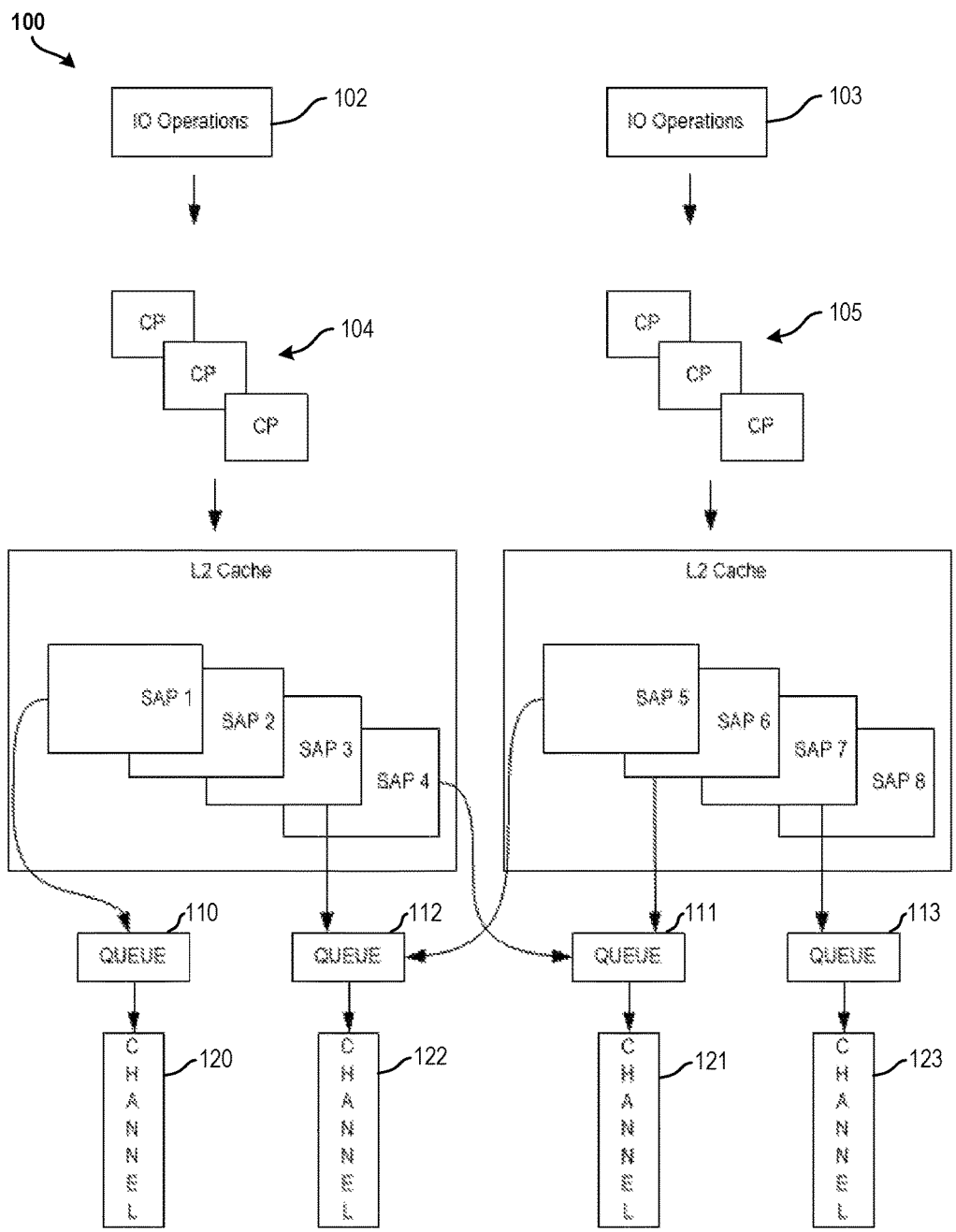
FIG. 1 illustrates a block diagram of a processing system utilizing a single CCA queue for an I/O channel according to examples of the present disclosure.

Various implementations are described below by referring to several examples of dispatching input/output (I/O) traffic to I/O channels with multiple channel communication array (CCA) queues. Traditional channels utilize one CCA queue in each direction (e.g., send and receive) for communicating traffic between the IOP and the I/O channel. For example, FIG. 1 illustrates a block diagram of a processing system utilizing a single CCA queue for an I/O channel according to examples of the present disclosure.

Generally, IOPs (e.g., SAP 1, SAP 2, SAP 3, SAP 4, SAP 5, SAP 6, SAP 7, and SAP 8) collect work from central processors (CPs) 104, 105 that are executing instructions (e.g., I/O operations 102, 103). When the CPs 104, 105 encounter an I/O instruction, the I/O instruction is then offloaded to one of the IOPs (e.g., SAP 1, SAP 2, SAP 3, SAP 4, SAP 5, SAP 6, SAP 7, and SAP 8). In the example of FIG. 1, each of the I/O channels 120-123 has access to a single queue 110, 111, 112, 113 respectively. The queues 110-113 may be referred to as CCA queues.

The IOP offloads the received I/O operations to one of the I/O channels 120, 121, 122, 123 using the queues 110, 111, 112, 113 respectively. In other words, the IOP queues up the I/O command for one of the channels using the queue for that channel. For example, if one of the CPs 104 encounters an I/O instruction, the CP offloads the I/O instruction to SAP 3. Subsequently, SAP 3 sends the I/O instruction to the channel 122 via the queue 112. That is, the SAP 3 queues the I/O instruction to the queue 112 to await execution by the channel 122.

Various problems arise from using a single CCA queue. For example, multiple IOPs reading or writing to the same CCA queue can encounter busy situations due to another IOP accessing the same CCA queue. As illustrated in FIG. 1, SAP 3 and SAP 5 both access the same CCA queue (e.g., the queue 112). In such situations, the CCA queue cannot handle the offloaded instruction from both IOPs.

In addition, an individual CCA queue full condition can occur, which can cause delays in the flow of I/O traffic. For example, a CCA queue may be a 15-entry queue or another finite size queue. If the number of I/O instructions sent to a channel exceeds the size of the queue, a CCA queue full condition occurs, and the queue cannot accept the excess I/O instructions.

Additionally, in a one CCA queue per channel implementation, there is limited ability to drive a higher rate of I/O traffic to and from a particular channel. Some communications require serialized responses from the channel, which can slow down performance-critical work using the same pipe to the channel. Moreover, traditional single CCA queue per channel implementations have limited flexibility for performance gains and cache optimizations.

Accordingly, to solve these problems, the present techniques provide multiple CCA queues per channel as well as an additional queue(s) for serialized operations. In particular, in order to maximize throughput on a channel, the present techniques implement a number of redundant CCA queues for a performance-critical workload. By enabling more than one pipe to an I/O channel, concurrent operations by multiple IOPs can be supported simultaneously. In examples, this is work that can be handled in parallel and out-of-order.

Figure 2:
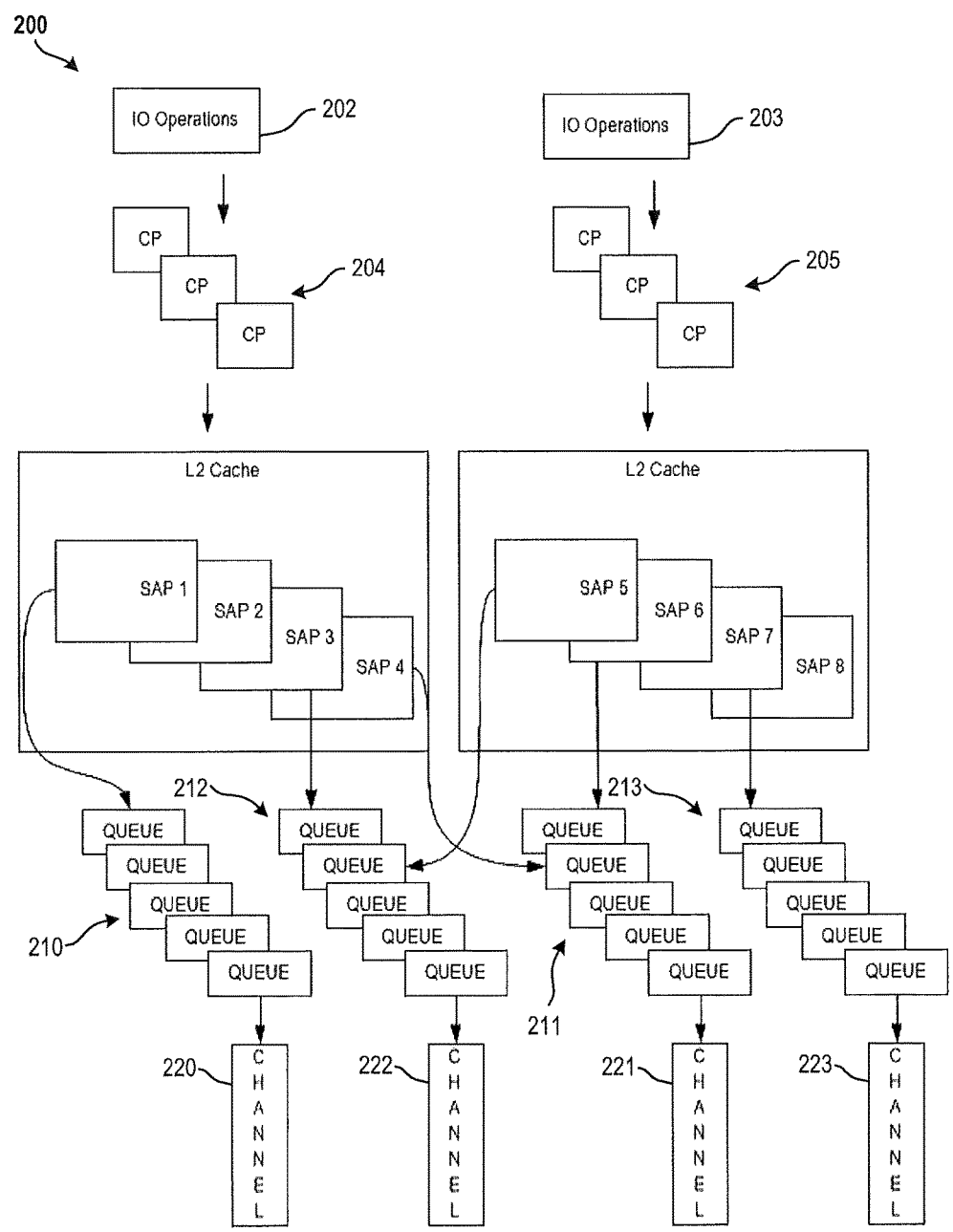
FIG. 2 illustrates a block diagram of a processing system utilizing multiple CCA queues for an I/O channel according to examples of the present disclosure.

As channels and processors have increased in bandwidth and performance capabilities, additional capacity within the queues is needed. FIG. 2 illustrates a block diagram of a processing system utilizing multiple CCA queues for an I/O channel according to examples of the present disclosure.

Generally, IOPs (e.g., SAP 1, SAP 2, SAP 3, SAP 4, SAP 5, SAP 6, SAP 7, and SAP 8) collect work from central processors (CPs) 204, 205 that are executing instructions (e.g., I/O operations 202, 203). When the CPs 204, 205 encounter an I/O instruction, the I/O instruction is then offloaded to one of the IOPs (e.g., SAP 1, SAP 2, SAP 3, SAP 4, SAP 5, SAP 6, SAP 7, and SAP 8). In the example of FIG. 2, each of the I/O channels 220-223 has access to a multi-queue 210, 211, 212, 213 respectively. The queues 210-213 may be referred to as CCA queues.

The IOP offloads the received I/O operations to one of the I/O channels 220, 221, 222, 223 using the queues 210, 211, 212, 213 respectively. In other words, the IOP queues up the I/O command for one of the channels using the queue for that channel. For example, if one of the CPs 204 encounters an I/O instruction, the CP offloads the I/O instruction to SAP 3. Subsequently, SAP 3 sends the I/O instruction to the channel 222 via the multi-queue 212. That is, the SAP 3 queues the I/O instruction to the multi-queue 212 to await execution by the channel 222.

If one of the CPs 205 encounters an I/O instruction, the CP offloads the I/O instruction to SAP 5, for example. Subsequently, SAP 5 sends the I/O instruction to the channel 222 via the multi-queue 212. That is, the SAP 5 queues the I/O instruction to the multi-queue 212 to await execution by the channel 222. Because of the multi-queue 212, both the SAP 3 and the SAP 5 can queue I/O operations for execution by the channel 222 without experiencing conflicts or queue full conditions. It should be appreciated that, as illustrated in FIG. 2, the SAP 3 may offload its instruction into a first queue of the multi-queue 212 and the SAP 5 may offload its instruction into a second queue of the multi-queue 212.

Figure 3:
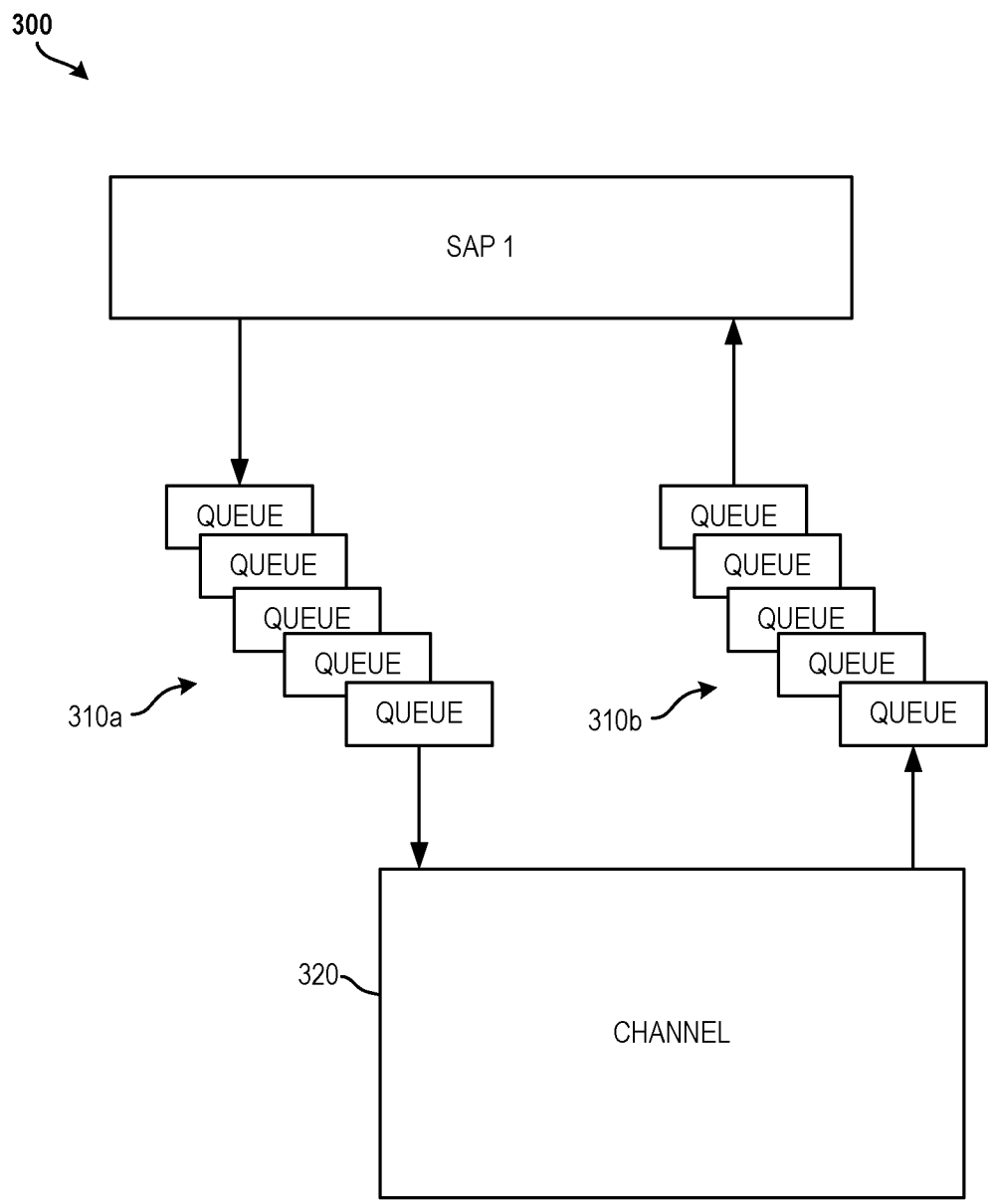
FIG. 3 illustrates a block diagram of a processing system utilizing dual multiple CCA queues for an I/O channel according to examples of the present disclosure.

In some examples, as illustrated in FIG. 3, two multi-queues-per-channel may be implemented for each channel to provide for bi-directional communication. In such cases, one set of CCA queues handle north-bound traffic (i.e., traffic from the channel) and one set of queues handle south-bound traffic (i.e., traffic to the channel).

In additional examples, one or more extra queues may be added to each of the multi-queues-per-channel to provide for serialized operations. Isolating the serialized operations to dedicated queues to and from the channel enables an I/O traffic queues to operate independently. This removes the overhead these sequences can cause on an I/O traffic queue.

Because the multi-queues are designed in a flexible manner with independent controls, queue assignments for performance optimization are possible. Individual SAPs or SAP groups can be assigned specific queues.

With queue flexibility, special situations can be handled, including recovery, system reconfiguration, and varying workload conditions. Multi-queue reassignments can be performed dynamically and concurrently with I/O traffic. Under varying workload conditions, multi-queue reassignments can be performed to optimize performance.

Queue assignments are performed in a manner to improve cache locality for the SAPs with respect to the CCA multi-queue locations and control blocks related to executing an I/O operation. As an example, by assigning one SAP to both an outbound multi-queue and an inbound multi-queue for an I/O operation, the control blocks remain local to the same cache (e.g., the L2 cache) for the entire operation.

Although the present disclosure describes instances of CCA queues and CCA multi-queues, it should be appreciated that the present techniques can be applied more broadly to any work queues between processing elements. In summary, the optimized parallel execution of the CCA multi-queues increases the total I/O capacity in a performance optimized way.

FIG. 3 illustrates a block diagram of a processing system 300 utilizing dual multiple CCA queues for an I/O channel according to examples of the present disclosure. In particular, the processing system 300 utilizes a first multi-queue 310*a* to handle southbound traffic and a second multi-queue 310*b* to handle northbound traffic. It should be appreciated that southbound traffic is traffic/data (e.g., I/O instructions) sent from the SAP 1 to the channel 320, and northbound traffic is traffic/data (e.g., acknowledgements, completed I/O instructions, etc.) sent from the channel 320 to the SAP1.

Figure 4:
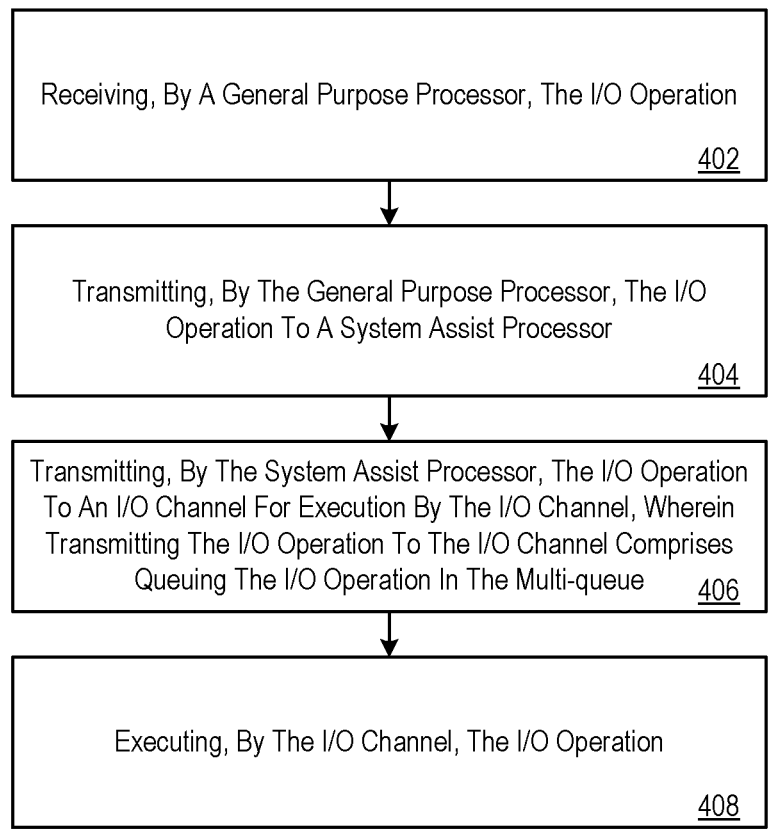
FIG. 4 illustrates a flow diagram of a method for queuing an input/output (I/O) operation in a multi-queue according to examples of the present disclosure.

FIG. 4 illustrates a flow diagram of a method 400 for queuing an input/output (I/O) operation in a multi-queue according to examples of the present disclosure. The method 400 may be implemented using a processing system, such as the processing system 100 of FIG. 1, the processing system 200 of FIG. 2, and/or the processing system 20 of FIG. 5.

At block 402, the method includes receiving, by a general purpose processor (e.g., one of the CPs 204, 205 of FIG. 2), the I/O operation (e.g., one of the I/O operations 202, 203 of FIG. 2).

At block 404, the method includes transmitting, by the general purpose processor, the I/O operation to a system assist processor (e.g., SAP 1, SAP 2, SAP 4, SAP 4, SAP 5, SAP 6, SAP 7, or SAP 8 of FIG. 2).

At block 406, the method includes transmitting, by the system assist processor, the I/O operation to an I/O channel (e.g., one of the channels 220-223 of FIG. 2) for execution by the I/O channel, wherein transmitting the I/O operation to the I/O channel comprises queuing the I/O operation in the multi-queue (e.g., one of the multi-queues 210-213 of FIG. 2). The multi-queue may be a channel communication array multi-queue or any other suitable type of multi-queue. In examples, multi-queue includes a plurality of queues dedicated to the I/O channel. For example, the multi-queue may be made up of four different queues. In some examples, an additional queue may be used for queuing serialized operations.

At block 408, the method includes executing, by the I/O channel, the I/O operation. Once the I/O channel executes the I/O operation, an acknowledgment may be sent back to the general purpose processor through the multi-queue (or through another multi-queue as illustrated in FIG. 3) and the system assist processor.

Additional processes also may be included, and it should be understood that the processes depicted in FIG. 4 represent illustrations, and that other processes may be added or existing processes may be removed, modified, or rearranged without departing from the scope and spirit of the present disclosure.

Example embodiments of the disclosure include or yield various technical features, technical effects, and/or improvements to technology. Example embodiments of the disclosure provide a multi-queue, such as a CCA multi-queue, to enable an I/O processor (i.e., a system assist processor) to offload I/O operations to a channel for execution by queuing the I/O operations in the multi-queue. These aspects of the disclosure constitute technical features that yield the technical effect of reducing busy situations caused by another IOP accessing the queue, increasing the number of I/O operations that can be queued up for execution by the channel, and the ability to serialize execution of the I/O operations. As a result of these technical features and technical effects, the present techniques constitute an improvement to existing technologies by providing flexibility for performance gains and cache optimizations. It should be appreciated that the above examples of technical features, technical effects, and improvements to technology of example embodiments of the disclosure are merely illustrative and not exhaustive.

The various components, modules, engines, etc. described herein may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include a processing device for executing those instructions. Thus a system memory can store program instructions that when executed by a processing device to implement the engines described herein. Other engines may also be utilized to include other features and functionality described in other examples herein.

Alternatively or additionally, the processing system 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

Figure 5:
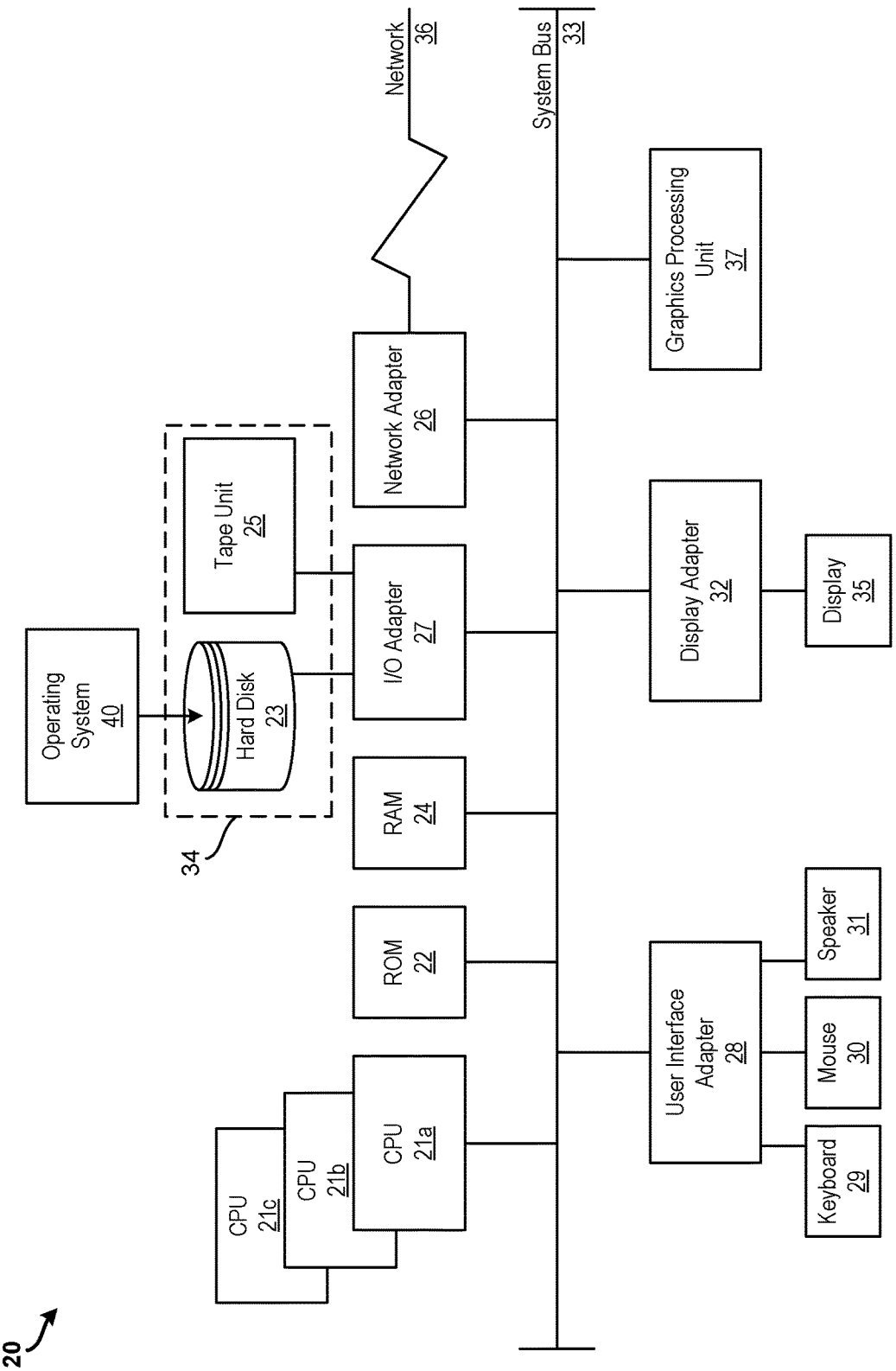
FIG. 5 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 5 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a network adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for queuing an input/output (I/O) operation in multi-queues, the method comprising:

receiving, by a general purpose processor, the I/O operation;

transmitting, by the general purpose processor, the I/O operation to a system assist processor;

transmitting, by the system assist processor, the I/O operation to an I/O channel for execution by the I/O channel, wherein transmitting the I/O operation to the I/O channel comprises queuing the I/O operation in a first multi-queue, wherein the first multi-queue comprises a first plurality of queues dedicated to the I/O channel, and wherein the first multi-queue queues data sent from the system assist processor to the I/O channel;

executing, by the I/O channel, the I/O operation; and responsive to completing the executing the I/O operation by the I/O channel, sending an acknowledgement of the completion to the system assist processor via a second multi-queue, wherein the second multi-queue comprises a second plurality of queues dedicated to the I/O channel, wherein the second plurality of queues of the second multi-queue differs from the first plurality of queues of the first multi-queue, and wherein the second multi-queue queues data sent from the I/O channel to the system assist processor.

2. The computer-implemented method of claim 1, wherein the first multi-queue is a channel communication array multi-queue.

3. The computer-implemented method of claim 1, wherein the first multi-queue comprises four queues.

4. The computer-implemented method of claim 1, wherein the first multi-queue comprises an additional queue for queuing serialized operations.

5. A system for queuing an input/output (I/O) operation in multi-queues, the system comprising:

a memory comprising computer readable instructions; and a processing device for executing the computer readable instructions for performing a method, the method comprising:

receiving, by a general purpose processor, the I/O operation;

transmitting, by the general purpose processor, the I/O operation to a system assist processor;

transmitting, by the system assist processor, the I/O operation to an I/O channel for execution by the I/O channel, wherein transmitting the I/O operation to the I/O channel comprises queuing the I/O operation in a first multi-queue, wherein the first multi-queue comprises a first plurality of queues dedicated to the I/O channel, and wherein the first multi-queue queues data sent from the system assist processor to the I/O channel;

executing, by the I/O channel, the I/O operation; and responsive to completing the executing the I/O operation by the I/O channel, sending an acknowledgement of the completion to the system assist processor via a second multi-queue, wherein the second multi-queue comprises a second plurality of queues dedicated to the I/O channel, wherein the second plurality of queues of the second multi-queue differs from the first plurality of queues of the first multi-queue, and wherein the second multi-queue queues data sent from the I/O channel to the system assist processor.

6. The system of claim 5, wherein the first multi-queue is a channel communication array multi-queue.

7. The system of claim 5, wherein the first multi-queue comprises four queues.

8. The system of claim 5, wherein the first multi-queue comprises an additional queue for queuing serialized operations.

9. A computer program product for queuing an input/output (I/O) operation in multi-queues, the computer program product comprising:

a computer readable storage medium having program instructions embodied therewith, the program instructions executable by a processing device to cause the processing device to perform a method comprising:

receiving, by a general purpose processor, the I/O operation;

transmitting, by the general purpose processor, the I/O operation to a system assist processor;

transmitting, by the system assist processor, the I/O operation to an I/O channel for execution by the I/O channel, wherein transmitting the I/O operation to the I/O channel comprises queuing the I/O operation in a first multi-queue, wherein the first multi-queue comprises a plurality of queues dedicated to the I/O channel, and wherein the first multi-queue queues data sent from the system assist processor to the I/O channel;

executing, by the I/O channel, the I/O operation; and responsive to completing the executing the I/O operation by the I/O channel, sending an acknowledgement of the completion to the system assist processor via a second multi-queue, wherein the second multi-queue comprises a second plurality of queues dedicated to the I/O channel, wherein the second plurality of queues of the second multi-queue differs from the first plurality of queues of the first multi-queue, and wherein the second multi-queue queues data sent from the I/O channel to the system assist processor.

10. The computer program product of claim 9, wherein the first multi-queue is a channel communication array multi-queue.

11. The computer program product of claim 9, wherein the first multi-queue comprises four queues.

12. The computer program product of claim 9, wherein the first multi-queue comprises an additional queue for queuing serialized operations.

* * * * *